US008477324B2

(12) United States Patent
Miyagi

(10) Patent No.: US 8,477,324 B2
(45) Date of Patent: Jul. 2, 2013

(54) IMAGE PROCESSOR AND IMAGE PROCESSING METHOD THAT USES S-SHAPED GAMMA CURVE

(75) Inventor: Noriko Miyagi, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 1905 days.

(21) Appl. No.: 11/342,536

(22) Filed: Jan. 31, 2006

(65) Prior Publication Data
US 2006/0187246 A1  Aug. 24, 2006

(30) Foreign Application Priority Data
Feb. 23, 2005  (JP) .................................. 2005-047592

(51) Int. Cl.
*G06F 3/12*  (2006.01)

(52) U.S. Cl.
USPC ....................................................... 358/1.13

(58) Field of Classification Search
USPC ........................................................ 358/520
See application file for complete search history.

(56) References Cited

U.S. PATENT DOCUMENTS

| 5,850,293 | A | * | 12/1998 | Suzuki et al. | ................. | 358/3.27 |
| 5,920,645 | A | | 7/1999 | Aida | | |
| 6,226,397 | B1 | | 5/2001 | Yamagata et al. | | |
| 6,643,397 | B1 | * | 11/2003 | Kanamori | ...................... | 382/162 |
| 2002/0186390 | A1 | * | 12/2002 | Hara | ............... | 358/1.9 |
| 2003/0058465 | A1 | | 3/2003 | Miyagi et al. | | |
| 2003/0095287 | A1 | | 5/2003 | Miyagi et al. | | |
| 2004/0114815 | A1 | * | 6/2004 | Shibaki et al. | ................. | 382/233 |
| 2004/0165081 | A1 | | 8/2004 | Shibaki et al. | | |
| 2004/0165747 | A1 | | 8/2004 | Shibaki et al. | | |
| 2004/0252316 | A1 | | 12/2004 | Miyagi et al. | | |
| 2004/0257622 | A1 | | 12/2004 | Shibaki et al. | | |
| 2005/0018258 | A1 | | 1/2005 | Miyagi et al. | | |
| 2005/0018903 | A1 | | 1/2005 | Miyagi et al. | | |
| 2005/0019681 | A1 | * | 1/2005 | Ito | ................... | 430/45 |
| 2005/0207661 | A1 | | 9/2005 | Miyagi et al. | | |

FOREIGN PATENT DOCUMENTS

| JP | 8-65530 | | 3/1996 |
| JP | 10-42150 | | 2/1998 |
| JP | 10-336466 | | 12/1998 |
| JP | 2002-247390 | * | 2/2001 |
| JP | 2001-94810 A | | 4/2001 |
| JP | 2001-119589 | | 4/2001 |
| JP | 2001-352453 | | 12/2001 |
| JP | 2002-247390 A | | 8/2002 |

* cited by examiner

*Primary Examiner* — Jeremiah Bryar
(74) *Attorney, Agent, or Firm* — Oblon, Spivak, McClelland, Maier & Neustadt, L.L.P.

(57) ABSTRACT

An image processor includes an automatic color determining unit that determines whether an input image signal including a plurality of color signals indicates a color image or a monochrome image, an operation panel for accepting selection of a color processing mode for applying color image processing and a monochrome processing mode for applying monochrome image processing, a filtering processor that applies image processing of at least one of the color processing and the monochrome processing, and an output controller. Even when the monochrome processing mode is accepted, the image processor applies monochrome image processing based on a determination result of the automatic color determining unit.

18 Claims, 14 Drawing Sheets

FIG. 2

| | USER SELECTION (OPERATION PANEL) | AUTOMATIC COLOR SELECTION | MONOCHROME SIGNAL GENERATION | SELECTOR | FILTERING PROCESS 1 | UCR/BLACK GENERATION | PRINTER GAMMA CORRECTION 4 |
|---|---|---|---|---|---|---|---|
| (1) | COLOR MODE | COLOR DOCUMENT | (SELECT Y') | SELECT OUTPUT SIGNAL FROM SCANNER COLOR CORRECTOR | SMOOTHING FILTER-1 EDGE AMOUNT CONVERSION LUT-1 | EDGE PORTION: BLACK GENERATION TABLE-2 NON-EDGE PORTION: BLACK GENERATION TABLE-1 | PRINTER GAMMA TABLE-1 |
| (2) | COLOR MODE | MONOCHROME DOCUMENT | (SELECT G) | SELECT OUTPUT SIGNAL FROM SCANNER COLOR CORRECTOR | SMOOTHING FILTER-2 EDGE AMOUNT CONVERSION LUT-2 | BLACK GENERATION TABLE-2 | PRINTER GAMMA TABLE-2 |
| (3) | MONOCHROME MODE | COLOR DOCUMENT | SELECT Y' | SELECT OUTPUT SIGNAL FROM MONOCHROME SIGNAL GENERATOR | SMOOTHING FILTER-1 EDGE AMOUNT CONVERSION LUT-1 | BLACK GENERATION TABLE-2 | PRINTER GAMMA TABLE-3 |
| (4) | MONOCHROME MODE | MONOCHROME DOCUMENT | SELECT G | SELECT OUTPUT SIGNAL FROM MONOCHROME SIGNAL GENERATOR | SMOOTHING FILTER-2 EDGE AMOUNT CONVERSION LUT-2 | BLACK GENERATION TABLE-2 | PRINTER GAMMA TABLE-4 |
| (5) | ACS MODE | COLOR DOCUMENT | | | SAME AS (1) | | |
| (6) | ACS MODE | MONOCHROME DOCUMENT | | | SAME AS (4) | | |

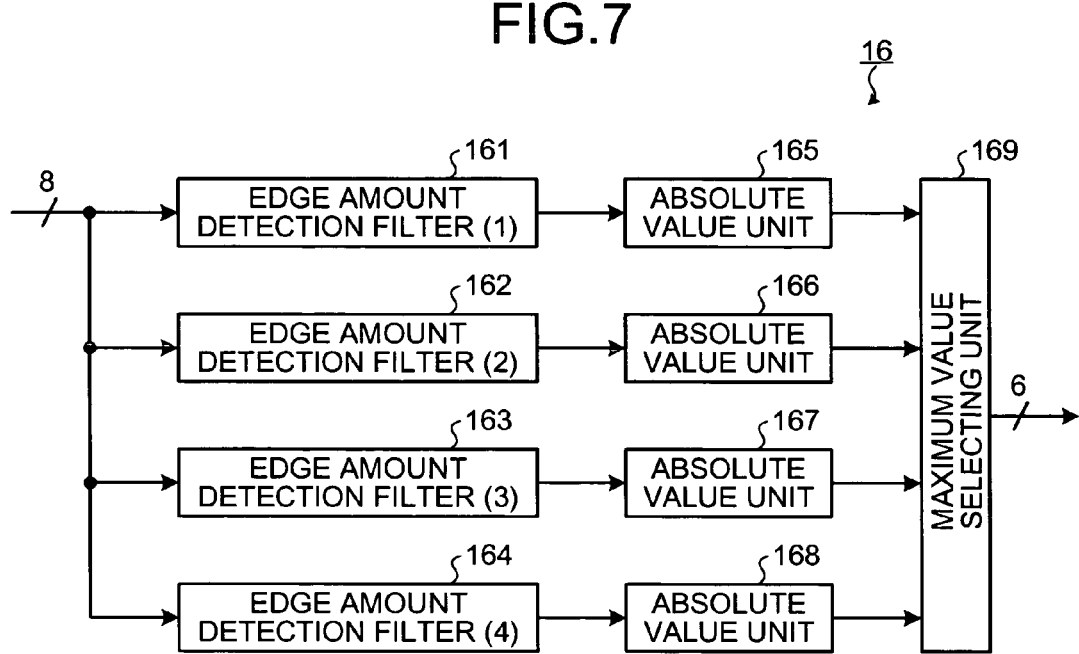

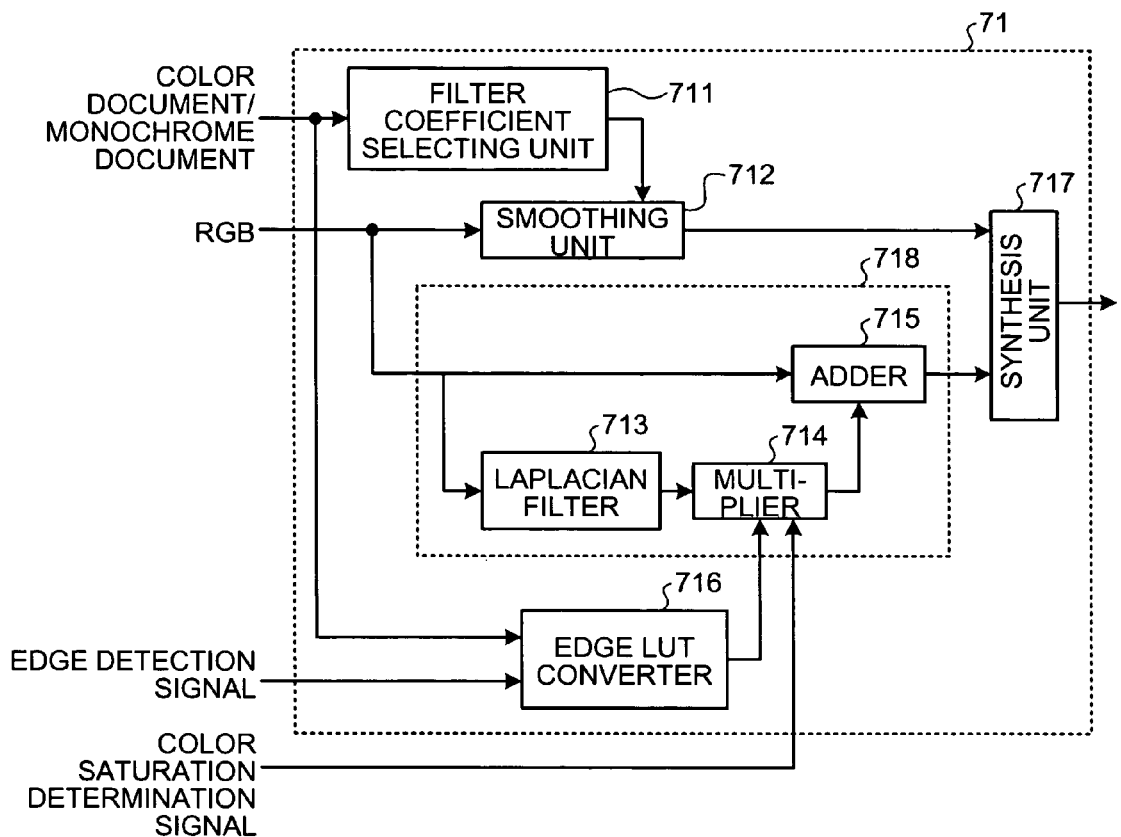

LAPLACIAN FILTER

| -1 | 0 | 0 | 0 | -1 |
|---|---|---|---|---|
| 0 | 0 | 0 | 0 | 0 |
| 0 | 0 | 4 | 0 | 0 |
| 0 | 0 | 0 | 0 | 0 |
| -1 | 0 | 0 | 0 | -1 |

| | USER SELECTION (OPERATION PANEL) | AUTOMATIC COLOR SELECTION | UCR/BLACK GENERATION |
|---|---|---|---|
| (1) | COLOR MODE | COLOR DOCUMENT | EDGE PORTION: BLACK GENERATION TABLE-2 NON-EDGE PORTION: BLACK GENERATION TABLE-3 |
| (2) | | MONOCHROME DOCUMENT | BLACK GENERATION TABLE-2 |
| (3) | MONOCHROME MODE | COLOR DOCUMENT | EDGE PORTION: BLACK GENERATION TABLE-2 NON-EDGE PORTION: BLACK GENERATION TABLE-3 |
| (4) | | MONOCHROME DOCUMENT | BLACK GENERATION TABLE-2 |

FIG.22

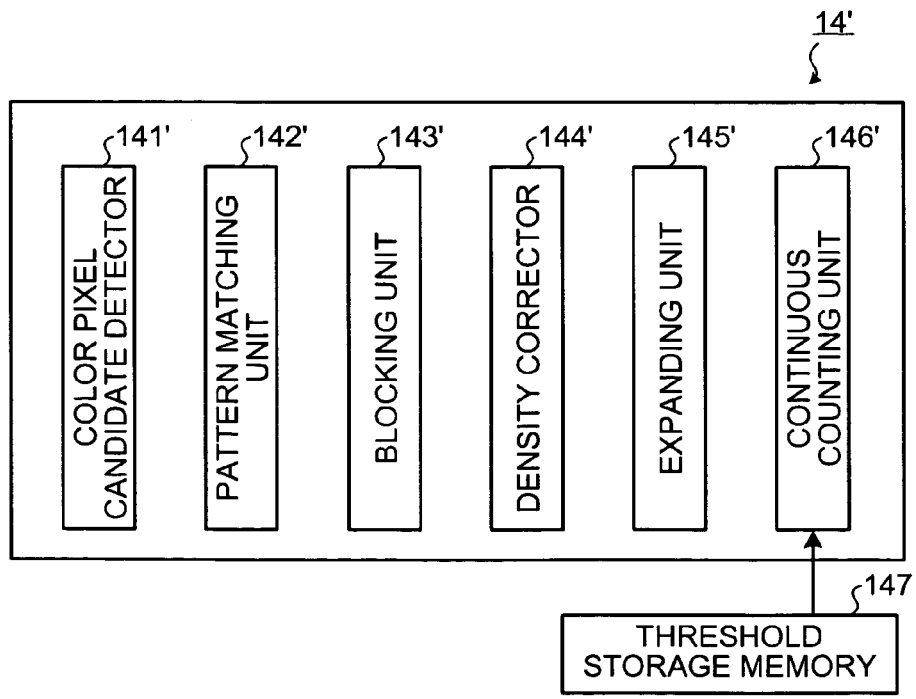

IMAGE PROCESSOR AND IMAGE PROCESSING METHOD THAT USES S-SHAPED GAMMA CURVE

CROSS-REFERENCE TO RELATED APPLICATIONS

The present document incorporates by reference the entire contents of Japanese priority document, 2005-047592 filed in Japan on Feb. 23, 2005.

BACKGROUND OF THE INVENTION

1. Field of the Invention

The present invention relates to an image processor, an image processing method, a program that makes computer execute the method, and a recording medium.

2. Description of the Related Art

Most of the recent color copying machines have an auto color selection (ACS) function. The color copying machines include an automatic color mode for determining whether to perform color image output or monochrome image output automatically by the ACS function. The color copying machines are configured to enable an operator to specify a mode among a plurality of modes such as a color mode for performing color image output and a monochrome mode for performing monochrome image output on an operation panel.

According to the ACS, rough pre-scanning is performed before the actual scanning, to determine whether a document is a color document or a monochrome document. However, since image information can be recently stored in a memory of the copying machine, pre-scanning is not necessary as disclosed in Japanese Patent Application Laid-open (JP-A) No. 2001-119589. Accordingly, users do not feel stressed by the time required for copying.

JP-A No. H10-336466 discloses an image forming apparatus that performs analysis for presuming which mode a user is going to select, to determine an output mode, instead of simply classifying a document image into color and monochrome.

JP-A No. 2001-352453 discloses a technique for performing image processing, taking into consideration an instance that a color document is reproduced in a monochrome image. The technique attempts to dissolve a problem in that characters on halftone dots cannot be read due to a weak contrast depending on colors, because of reproduction of the color document in a monochrome image by controlling the contrast in accordance with color edges.

In the case of the automatic color mode, the color image output is selected only when a document is a color document, and the monochrome image output is selected only when the document is a monochrome document. However, in the case of color mode, the document to be copied may not be limited to the color document, and in the case of monochrome mode, the document to be copied may not be limited to the monochrome document. With a color copying machine installed in stores such as convenience stores, the cost of color copy per one sheet is more expensive than the monochrome copy. Even in a case of a color document, if a monochrome copy is enough, the monochrome mode can be selected, in view of the cost. However, the technique disclosed in JP-A No. 2001-119589 does not correspond to such cases.

The technique disclosed in JP-A No. H10-336466 is based on the recognition that the selection of the color/monochrome output mode performed by a user is not simply based on the document type of color/monochrome. However, according to the presumption based on the analysis, it is difficult to set image formation appropriately.

According to the technique in JP-A No. 2001-352453, clear reproduction of characters has generally the highest priority in the monochrome mode. However, in the case of a color document, a pattern document formed of halftone dots with lines as large as about 175 must be presumed. Therefore, processing that does not harm the tone and processing that can obtain reproduced images with fidelity to original documents are desired. On the other hand, in the case of the monochrome document, the tone is not important as in the color document, and it is necessary to presume documents in which the highlighted side of the document is rough or isolated dots are present, such as dot document with about 100 lines represented by newspaper or binary printer output images, and hence, processing that can reproduce characters clearly while skipping highlighted dots is desired. However, the technique in JP-A No. 2001-352453 has a problem in that these demands cannot be satisfied.

SUMMARY OF THE INVENTION

It is an object of the present invention to at least solve the problems in the conventional technology.

According to one aspect of the present invention, an image processor includes a determining unit that determines whether an input image signal including a plurality of color signals indicates a color image or a monochrome image; a processing mode selecting unit that accepts selection of a color processing mode for applying color image processing and a monochrome processing mode for applying monochrome image processing; and an image processing unit that applies image processing of either one of color processing and monochrome processing to the input image signal, wherein when the processing mode selecting unit accepts selection of the monochrome processing mode, the image processing unit applies monochrome image processing to the input image signal based on the determination result by the determining unit.

According to another aspect of the present invention, an image processor includes a determining unit that determines whether an input image signal including a plurality of color signals indicates either one of a color image and a monochrome image; a processing mode selecting unit that accepts selection of a color processing mode for applying color image processing and a monochrome processing mode for applying monochrome image processing; and an image processing unit that applies image processing of either one of color processing and monochrome processing to the input image signal, wherein when the processing mode selecting unit accepts selection of the color processing mode, the image processing unit applies color image processing to the input image signal based on the determination result by the determining unit.

According to still another aspect of the present invention, an image processing method includes determining whether an input image signal including a plurality of color signals indicates either one of a color image and a monochrome image; selecting either one of a color processing mode for applying color image processing and a monochrome processing mode for applying monochrome image processing; and image processing either one of color processing and monochrome processing to the input image signal, wherein when selection of the monochrome processing mode is accepted, monochrome image processing is applied to the input image signal based on a result of the determination.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWING

FIG. 2 is a table for explaining processing for each reproduction mode;

FIG. 7 is a functional block diagram of an edge detector;

FIG. 8 is a schematic diagram of an example of an edge detection filter;

FIG. 11 is a functional block diagram of a Y signal filter processor (1);

FIG. 12 is a schematic diagram of an example of a smoothing filter used by the filter processor (1);

FIG. 21 is a table selected by the UCR/black generating unit according to an operator's selection and automatic color selection;

FIG. 22 is a functional block diagram of an automatic color determining unit in an image processor according to a third embodiment of the present invention.

DETAILED DESCRIPTION OF THE PREFERRED EMBODIMENTS

Exemplary embodiments of an image processor, an image processing method, a program that makes computer execute the method, and a recording medium according to the present invention are explained below in detail with reference to the accompanying drawings.

An image processor according to a first embodiment of the present invention applies not only simple monochrome image processing but also image processing based on the determination of an automatic color determining unit, even when a monochrome image processing mode by an operator's selection has been accepted.

Figure 1:
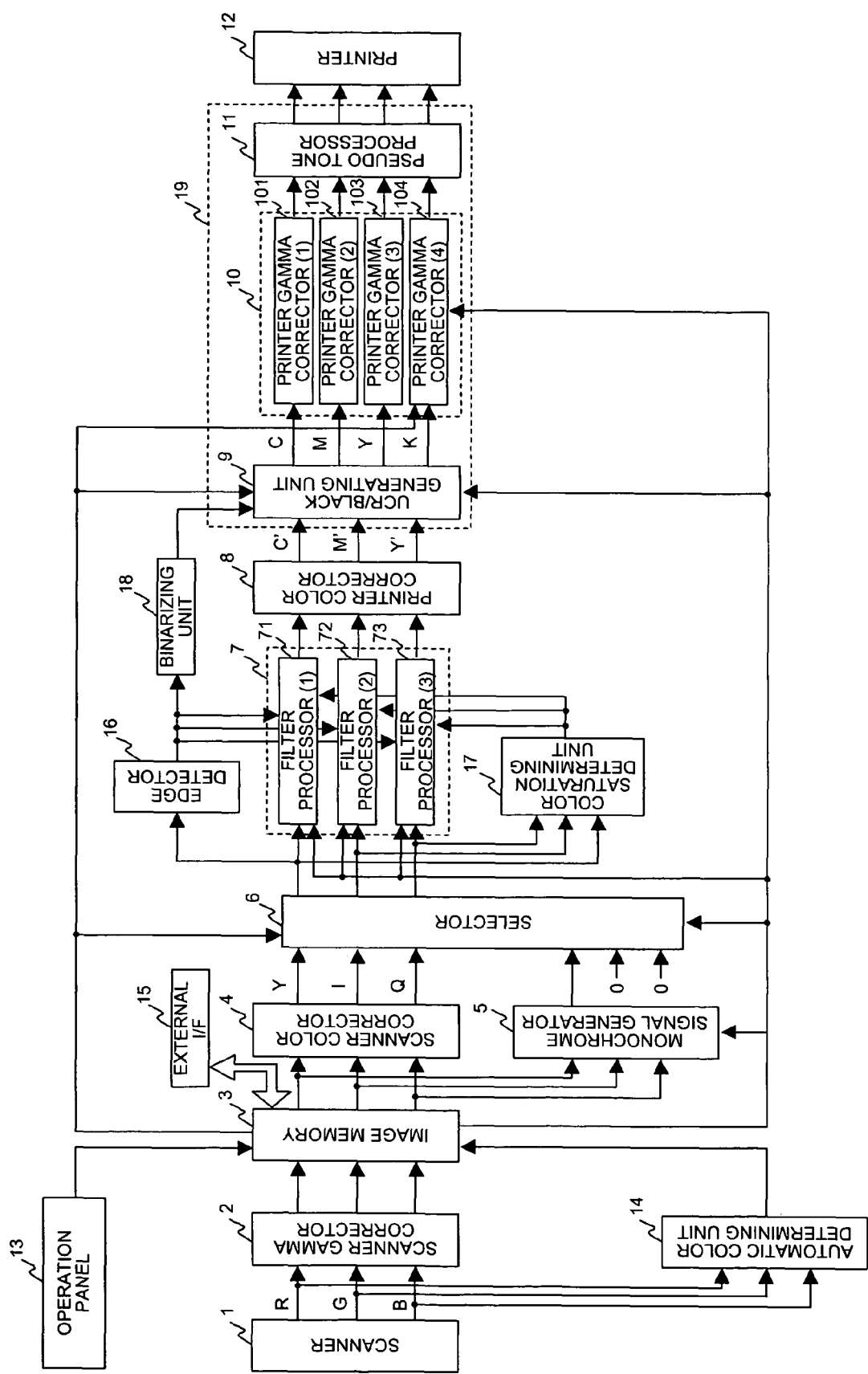
FIG. 1 is a functional block diagram of an image processor according to a first embodiment of the present invention.

FIG. 1 is a functional block diagram of the image processor according to the first embodiment. An image processor 100 includes a scanner 1, a scanner gamma corrector 2, an image memory 3, a scanner color corrector 4, a monochrome signal generator 5, a selector 6, a filter processor 7, a printer color corrector 8, an UCR/black generating unit 9, a printer gamma corrector 10, a pseudo tone processor 11, a printer 12, an operation panel 13, an automatic color determining unit 14, an external I/F 15, an edge detector 16, a color saturation determining unit 17, a binarizing unit 18, and an output processor 19.

The scanner 1 reads a document to obtain a color image signal formed of RGB.

The operation panel 13 is for a user to select and input number of copies, paper size, and the like, and accepts reproduction mode selection from a color mode, a monochrome mode, and an ACS mode as one of the selection items, and executes an acceptance display function.

FIG. 2 is a table for explaining processing for each reproduction mode. The details of each processing will be given later. Since the details of the ACS mode are the same as those of the color mode and the monochrome mode, only the color mode and the monochrome mode are explained in order to omit repeated explanations.

Figure 3:
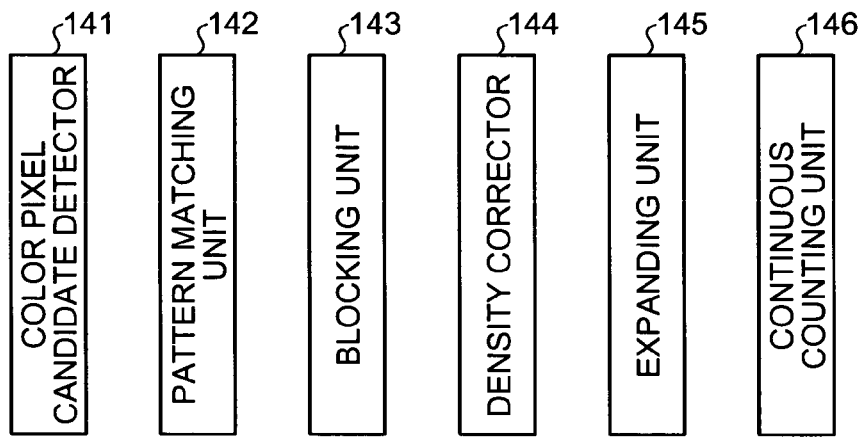
FIG. 3 is a functional block diagram of an automatic color determining unit.

FIG. 3 is a functional block diagram of the automatic color determining unit 14. The automatic color determining unit 14 has a color pixel candidate detector 141, a pattern matching unit 142, a blocking unit 143, a density corrector 144, an expanding unit 145, and a continuous counting unit 146. The automatic color determining unit 14 determines whether the document read by the scanner 1 is a color document or a monochrome document.

The color pixel candidate detector 141 determines whether a difference between the maximum value and the minimum value of RGB of a target pixel is larger than a preset threshold Th_col. When the difference is larger than the threshold Th_col, that is, when Max(R, G, B)−Min(R, G, B)>Th_col, the color pixel candidate detector 141 designates the target pixel as a color pixel candidate.

Figure 4:
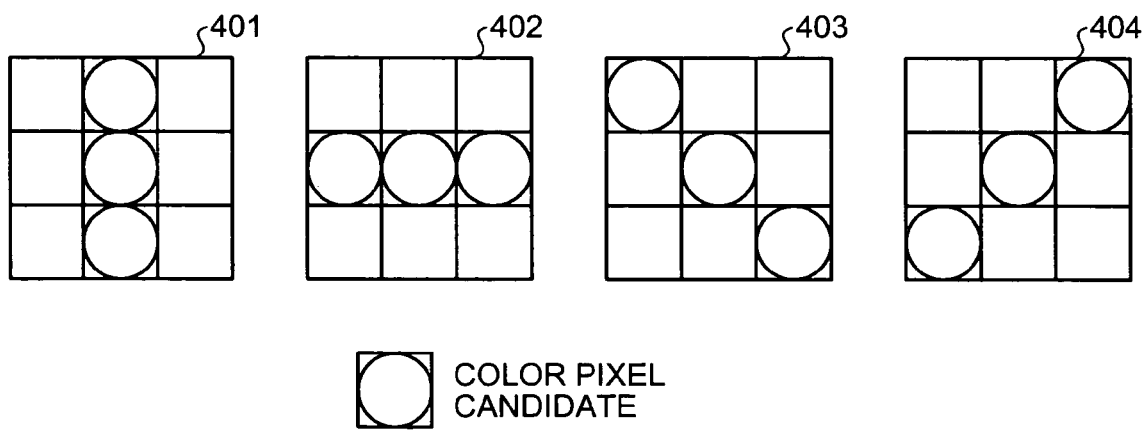
FIG. 4 is an explanatory diagram of a color pixel pattern in 3×3 pixels.

FIG. 4 is an explanatory diagram of a color pixel pattern in 3×3 pixels. The pattern matching unit 142 refers to the 3×3 pixels, centering on the target pixel, and when the color pixel candidate matches with any pattern in FIG. 4, determines that the target pixel is a color pixel.

The blocking unit 143 refers to pixels in a unit of 4×4 pixels, and if there are color pixels of more than 1, designates the unit as a color pixel block, to perform the subsequent processing in a unit of block. The density corrector 144 refers to 3×3 blocks, centering on the target block, and when the target block is a color pixel block, and there are three or more color pixel blocks in the reference block, designates the block as an active block (=color pixel block). A block that does not match with the condition is designated as a non-active block, thereby removing an isolated block.

The expanding unit 145 refers to 9×9 blocks, centering on the target block, and if there is one active block, designates the target block as the active block.

Figure 5:
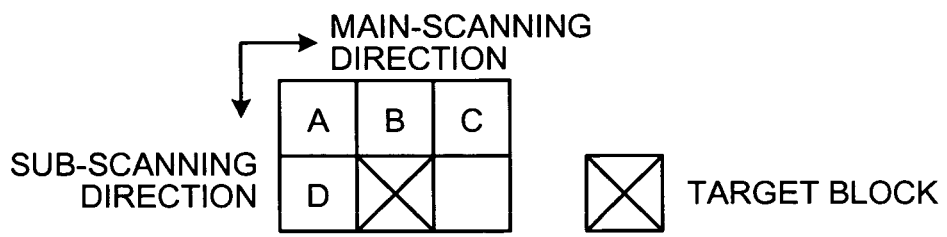
FIG. 5 is an explanatory diagram of calculation of a continuous count value CNT in a pixel block.

FIG. 5 is an explanatory diagram of calculation of a continuous count value CNT in the pixel block. The continuous counting unit 146 calculates a continuous count value CNT in the pixel block, and obtains the continuous count value CNT (target block) in the target block in the pixel blocks of upper left (A), top (B), upper right (C), and left (D) shown in FIG. 5 according to the following equation.
(1) When CNT(A)=CNT(B)=CNT(C)=0, m=1,
(2) When CNT(A)=CNT(B)=CNT(C)≠0, m=0,
(3) When the target block is a color pixel block, CNT (target block)=Max(CNT(A)+1, CNT(B)+1, CNT(C)+m, CNT(D)+1), and (4) when the target block is not a color pixel block,
CNT(target block)=0.

The reason why the continuous count value of the upper right pixel block C is handled differently from others is to prevent double counting. At a point in time when the continuous count value becomes equal to the preset threshold Th_acs, it is determined that the document is a color document. If it is not determined as the color document to the last minute, it is determined that the document is a monochrome document.

The scanner gamma corrector 2 converts a signal having a linear reflectance to a signal having a linear density, and corrects the gray balance of the scanner 1.

The image memory 3 stores the image information temporarily. The external I/F 15 outputs an image in the image memory by the printer or transmits the image to an external equipment according to a user's instruction. A reproduction mode selection signal selected and input by the user from the operation panel 13 and the automatic color determination result are written in a header of the stored image. The image stored in the image memory 3 is directly read and transmitted to the subsequent stage. At this time, the information written in the header is read out. An image in the image memory can be specified by the user later and printed, or transmitted to the external equipment via the external I/F 15 (interface), in addition to the normal copy flow (the flow in the copy procedure).

The scanner color corrector 4 converts the RGB image obtained by the scanner 1 to a color space signal, which does not depend on the scanner 1 or the printer 12. The scanner color corrector 4 changes the color space after the conversion to a color space of a luminance/color difference signal system. In the first embodiment, Y indicates the luminance and I and Q indicate a color difference in the YIQ.

Figure 6:
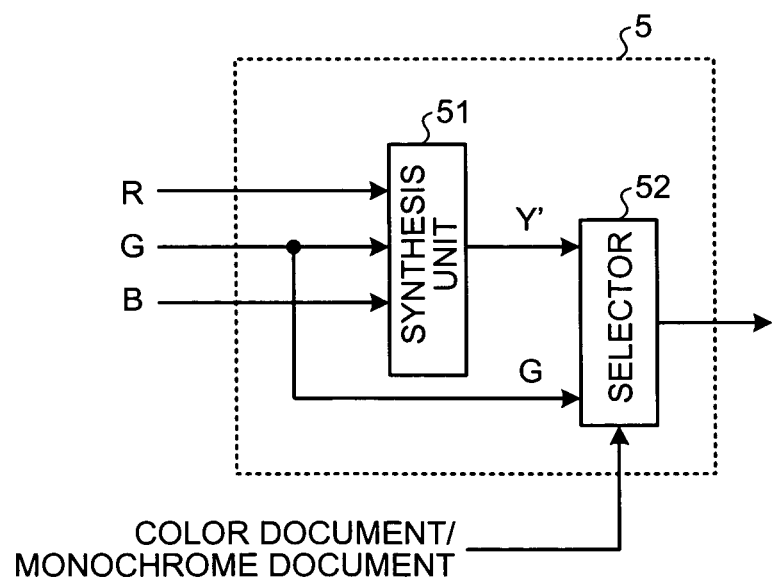
FIG. 6 is a functional block diagram of a monochrome signal generator.

FIG. 6 is a functional block diagram of the monochrome signal generator 5. The monochrome signal generator 5 has a synthesis unit 51 and a selector 52, to generate a monochrome signal for performing monochrome image reproduction from the color image signal. The synthesis unit 51 synthesizes the RGB signals at a predetermined ratio to generate a Y' signal. In this example, the synthesis unit 51 synthesizes the RGB signals at 1:2:1. Namely, if it is expressed by an equation, Y'=R+2G+B is established.

The selector 52 selects the synthesized signal Y' in the case of a color document, and selects a G signal in the case of a monochrome document. In the case of a color document, if the G signal is selected, even when the G signal has the same value and the R and B signals have different values, these values become the same, and hence, the tone is not reproduced with fidelity. Accordingly, it is better to use the synthesized signal Y'. In the case of a monochrome document, if the synthesized signal Y' is selected, there is the possibility that a character edge portion becomes dull due to an influence of out of color registration at the time of scanner input, and hence, a single color signal G is used.

The selector 6 selects an output signal YIQ from the scanner color corrector 4 in the case of color image reproduction (the color mode, or the ACS mode and a color document), and selects an output signal Y' and an achromatic color I', Q' (here I'=Q'=0) from the monochrome signal generator 5 in the case of monochrome image reproduction (at the time of the monochrome mode, or the ACS mode and a monochrome document) in accordance with a reproduction mode selecting signal from the operation panel 13 and with a determination result of the automatic color determining unit 14.

FIG. 7 is a functional block diagram of the edge detector. FIG. 8 is a schematic diagram of an example of an edge detection filter. The edge detector 16 detects edge portions in the image. The edge detector 16 includes an edge amount detection filter (1) 161, an edge amount detection filter (2) 162, an edge amount detection filter (3) 163, and an edge amount detection filter (4) 164, and uses the four types of 7×7 filters shown in FIG. 8, to perform a masking process, respectively.

A maximum value selecting unit 169 selects the maximum value out of the absolute values obtained by absolute value units 165 to 168 from these four outputs, and outputs the thus selected signal by a 6-bit signal. In the case of the value being 64, the sixth power of 2, or more, the value is set to 63.

Figure 9:
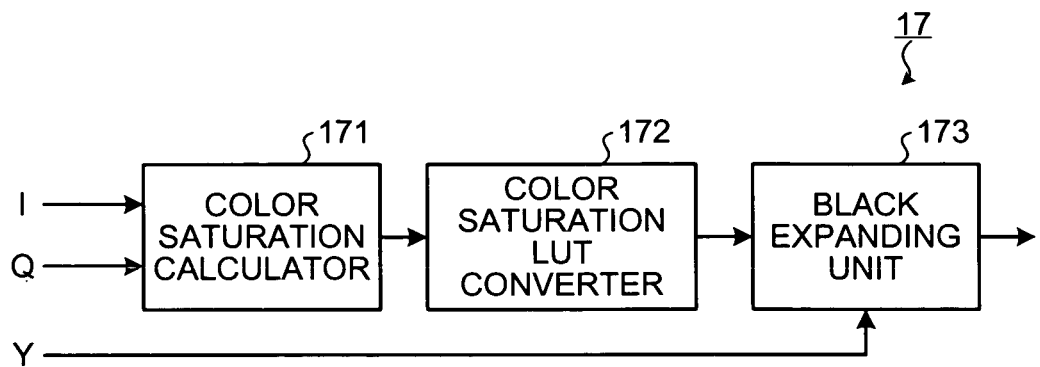
FIG. 9 is a functional block diagram of a color saturation determining unit.
Figure 10:
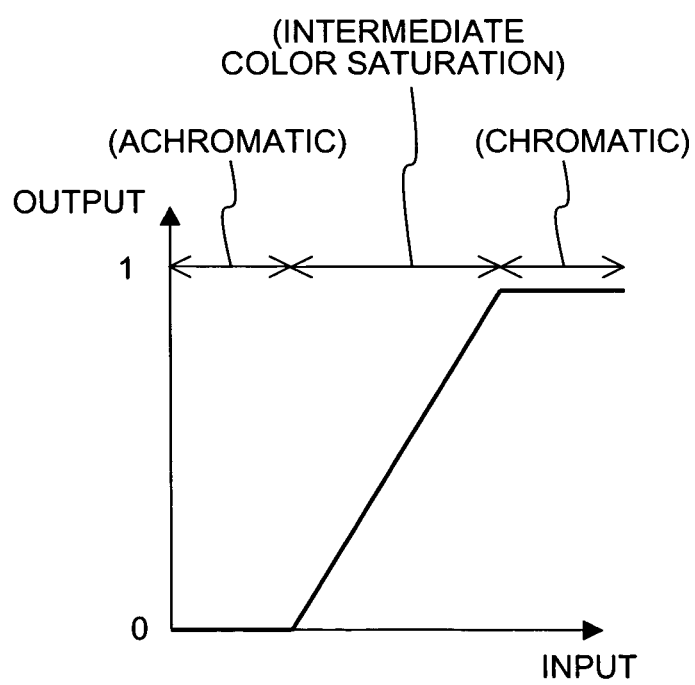
FIG. 10 is a schematic diagram representing an example of a color saturation correction table.

FIG. 9 is a functional block diagram of the color saturation determining unit 17. FIG. 10 is a schematic diagram of an example of a color saturation correction table. The color saturation determining unit 17 has a color saturation calculator 171, a color saturation LUT converter 172, and a black expanding unit 173. The color saturation determining unit 17 determines the color saturation for each pixel.

The color saturation calculator 171 calculates I×I+Q×Q from the I and Q signals, and designates the result as the color saturation. The color saturation LUT converter 172 uses the table in FIG. 10 with respect to the calculated color saturation, to perform LUT conversion, and corrects a low color saturation area to 0 (achromatic color), and a high color saturation area to 1 (chromatic color).

The black expanding unit 173 refers to the color saturation and the luminance value Y of the peripheral 5×5 pixels of the target pixel, to determine the color saturation value Cb of a pixel having the lowest color saturation (close to the achromatic color) of the pixels having a luminance value lower than a predetermined threshold (not pure white) except of the target pixel, and corrects the color saturation Ca of the target pixel to Ca'=Min(Ca, Cb). The black expansion process is for eliminating the influence of out of color registration at the time of scanner input, and for suppressing a highlight process with respect a color difference signal around a black character on a chromatic color ground.

The filter processor 7 has a filter processor (1) 71, a filter processor (2) 72, a filter processor (3) 73, and a filter processor (4) 74. The filter processor 7 refers to the determination results of the edge detector 16 and the automatic color determining unit 14, to perform a filtering process such that in the case of a color document, undulations of halftone dots up to about 175 lines are suppressed to reduce moiré, while enhancing the sharpness of character portions. The filtering process includes a relatively strong smoothing filtering process and an adaptive edge enhancement process.

With respect to a monochrome image, processing for giving higher priority to character image quality and dot images up to about 100 lines is performed. This filtering process includes a relatively weak smoothing filtering process and a non-adaptive edge enhancement process.

FIG. 11 is a functional block diagram of the filter processor (1) 71 for Y signals. FIG. 12 is a schematic diagram of an example of the smoothing filter used by the filter processor (1) 71. The filter processor (1) 71 has a filter coefficient selecting unit 711, a smoothing unit 712, a Laplacian filter 713, a multiplier 714, an adder 715, an edge LUT converter 716, a synthesis unit 717, and an edge enhancement unit 718.

The smoothing unit 712 and the edge enhancement unit 718 perform a filtering process, and the results of the two filtering processes are synthesized at a predetermined rate. Most simply, the synthesis is performed at 1:1, that is, the two results are added and then divided by 2.

The filter coefficient selecting unit 711 switches the parameter of the smoothing filter used in the smoothing unit 712, according to the automatic color determination result. As the parameter of the smoothing filter, if the document is a color document, a smoothing filter 1 (1101) is selected, and if the document is a monochrome document, a smoothing filter 2 (1102) is selected.

The edge enhancement unit 718 multiplies the result (Lap (S)) of applying the Laplacian filter 713 by using a converted edge detection signal (LUT (Edge)) obtained by converting an edge detection signal (Edge) by the edge LUT converter 716 and a color saturation determination signal (C) by the multiplier 714, and the obtained result is added to a signal (S) before the edge enhancement. This is expressed as:

$$S'=S+\text{Lap}(S)\times LUT(\text{Edge})/63\times C.$$

Figures 13, 14:
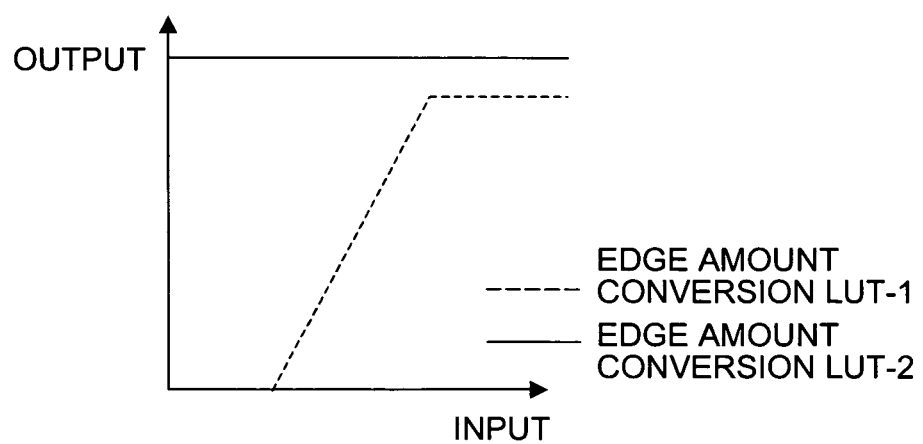
FIG. 13 is a schematic diagram of an example of a Laplacian filter.
FIG. 14 is a schematic diagram representing LUT conversion tables.

FIG. 13 is a schematic diagram of an example of the Laplacian filter. FIG. 14 is an LUT conversion table. The Laplacian filter 13 shown in FIG. 11 uses the 5×5 filter 1201 shown in FIG. 13.

The edge LUT converter 716 uses the LUT conversion table in FIG. 14. In the case of a color document, the edge LUT converter 716 performs LUT conversion by using an edge amount conversion LUT-1, to convert a smaller result of the edge detection results expressed by 6 bits (0 to 63) to zero, thereby correcting noise and the edge detection result at a high line number dots to zero. On the other hand, a larger edge detection result is corrected to near the maximum value 63, so that edge enhancement is appropriately applied even to fine lines. In the case of a monochrome document, the edge LUT converter 716 performs LUT conversion by using an edge amount conversion LUT-2, to make the adaptive edge enhancement process substantially invalid, thereby applying the edge enhancement process uniformly up to small parts of all characters.

The filter processor (2) 72 for I signals and the filter processor (3) 73 for Q signals have the same configuration as that for Y signals, and are different in a portion where the color saturation is multiplied by the multiplier 714, such that (1-C) is multiplied instead of C, as follows:

$$S'=S+\text{Lap}(S)\times LUT(\text{Edge})/63\times(1-C)$$

A black edge prevents coloring from being enhanced by increasing the amount of enhancement with respect to luminance Y, and a color edge prevents an occurrence of color turbidness by increasing the amount of enhancement with respect to color difference I and Q.

The printer color corrector 8 performs conversion from YIQ signals to C', M', Y' signals corresponding to the toner color of the printer by a 3D-LUT. A parameter ensuring an achromatic color is set to the 3D-LUT so that C'=M'=Y' when IQ are achromatic colors.

The UCR/black generating unit 9 generates black by generating a K signal corresponding to the C' M' Y' data, and reduces an amount corresponding to K from C' M' Y', to perform under color removal (UCR). At this time, the UCR/black generating unit 9 refers to the detection result of the edge detector 16' in addition to a reproduction mode selection signal and the automatic color determination result, to control the black amount and the amount of under color removal.

The binarizing unit 18 binarizes the edge detection result. As a result of binarization, it is determined to perform control according to the edge/non-edge, however, the control is not limited to the binary control. Since a multivalue control apparatus is already available, explanation thereof is omitted, and it can be easily applied to the invention.

Figure 15:
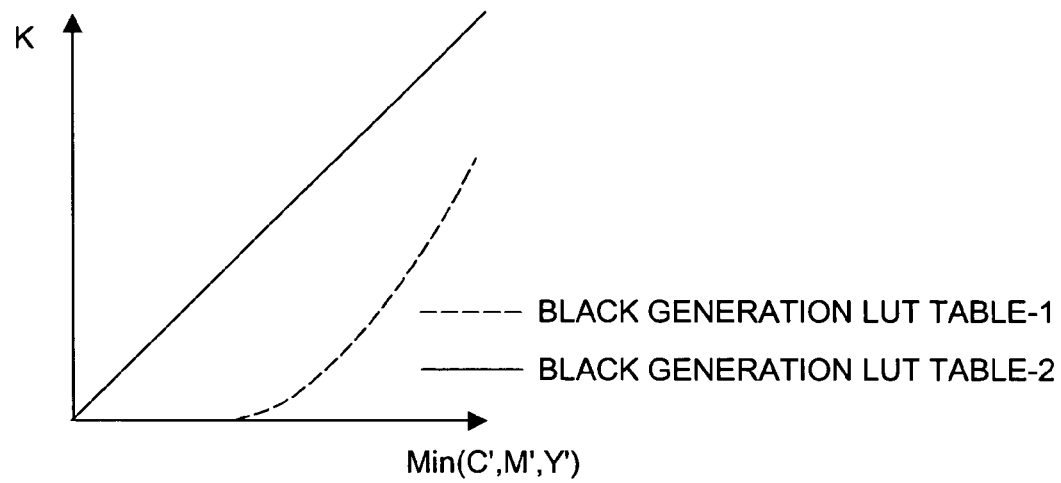
FIG. 15 is a schematic diagram representing black generation LUT tables used by an UCR/black generating unit.

FIG. 15 is a black generation LUT table used by the UCR/black generating unit 9. The UCR/black generating unit 9 inputs the minimum value Min(C', M', Y') of the C', M', and Y', and outputs K by referring to the LUT. Under color removal is performed according to the following equation.

$$C=C'-K$$

$$M=M'-K$$

$$Y=Y'-K$$

Figure 16:
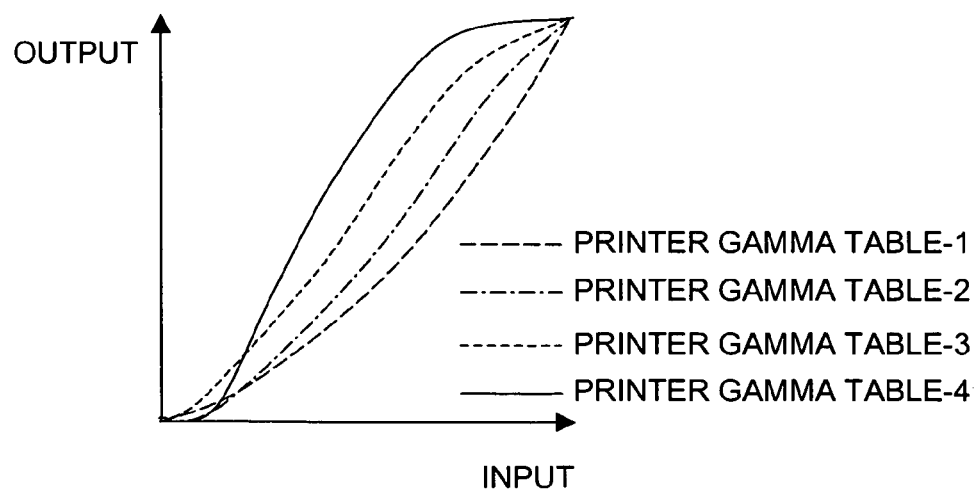
FIG. 16 is a schematic diagram representing examples of gamma tables used by a printer gamma corrector.

FIG. 16 is one example of a gamma table used by the printer gamma corrector 10. The printer gamma corrector 10 has printer gamma correctors (1) 101 to (4) 104. The printer gamma correctors (1) 101 to (4) 104 use gamma table-1 to gamma table-4 shown in FIG. 16, respectively. The graph shown by solid line is a gamma table of the printer gamma corrector (4) 104, which is a gamma corrector for K signals.

The pseudo tone processor 11 performs tone processing by error diffusion for each of CMYK printings.

The printer 12 outputs a color image formed of CMYK subjected to the pseudo tone processing by the pseudo tone processor 11. The printer 12 also outputs a monochrome reproduced image, in which CMY are substantially zero (white), and only K includes effective data.

Figure 17:
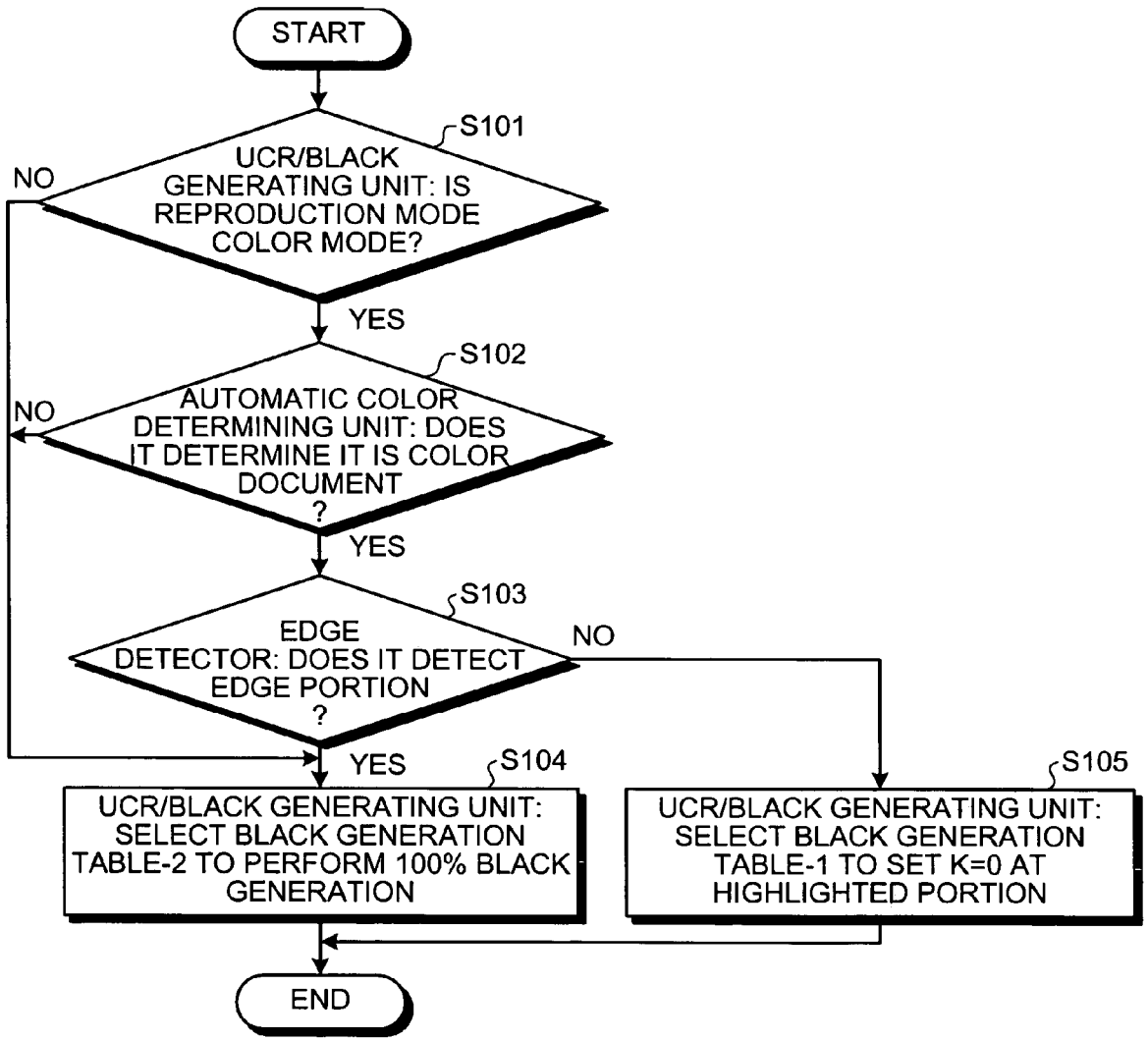
FIG. 17 is a flowchart of a process procedure of the UCR/black generating unit.

FIG. 17 is a flowchart of a process procedure of the UCR/black generating unit 9. An image processing procedure is explained here, while changing over the black generation table used by the UCR/black generating unit 9 in the case of the color processing mode and the monochrome processing mode by the operator's setting, and according to whether there is an edge.

The UCR/black generating unit 9 first determines whether the reproduction mode is set to the color mode (step S101). When it is determined that the reproduction mode is the color mode (step S101, Yes), the UCR/black generating unit 9 detects whether the automatic color determining unit 14 determines that a document is a color document (step S102). When the automatic color determining unit 14 determines that the document is a color document (step S102, Yes), the edge detector 16 detects whether a detected part is an edge (step S103). When the edge detector 16 detects that the detected part is an edge (step S103, Yes), the UCR/black generating unit 9 selects the black generation table-2 (FIG. 15), and directly replaces the Min(C', M', Y') by the K signal, to perform 100% black generation (step S104).

On the other hand, when the detection result of the edge detector 16 indicates a non-edge portion (step S103, No), the UCR/black generating unit 9 selects the black generation table-1 (FIG. 15), to perform black generation such that a granular feel is reduced by setting K=0 at a highlighted portion (step S105).

When the reproduction mode is the color mode, and the document is a monochrome document (step S102, No), the UCR/black generating unit 9 selects the black generation table-2 regardless of the edge detection result, to perform 100% black generation (step S104).

Furthermore, when the set reproduction mode is the monochrome mode (step S101, No), the UCR/black generating unit 9 selects the black generation table-2 regardless of the edge detection result, to perform 100% black generation.

At the time of monochrome mode, the processing is for inputting effective data for monochrome reproduction only to K, by setting C=M=Y=0, and the processing is inevitable. However, when the mode is the color mode and the document is a monochrome document, a reproduction image with excellent black character reproducibility can be output by using dark black, even in the color mode.

Figure 18:
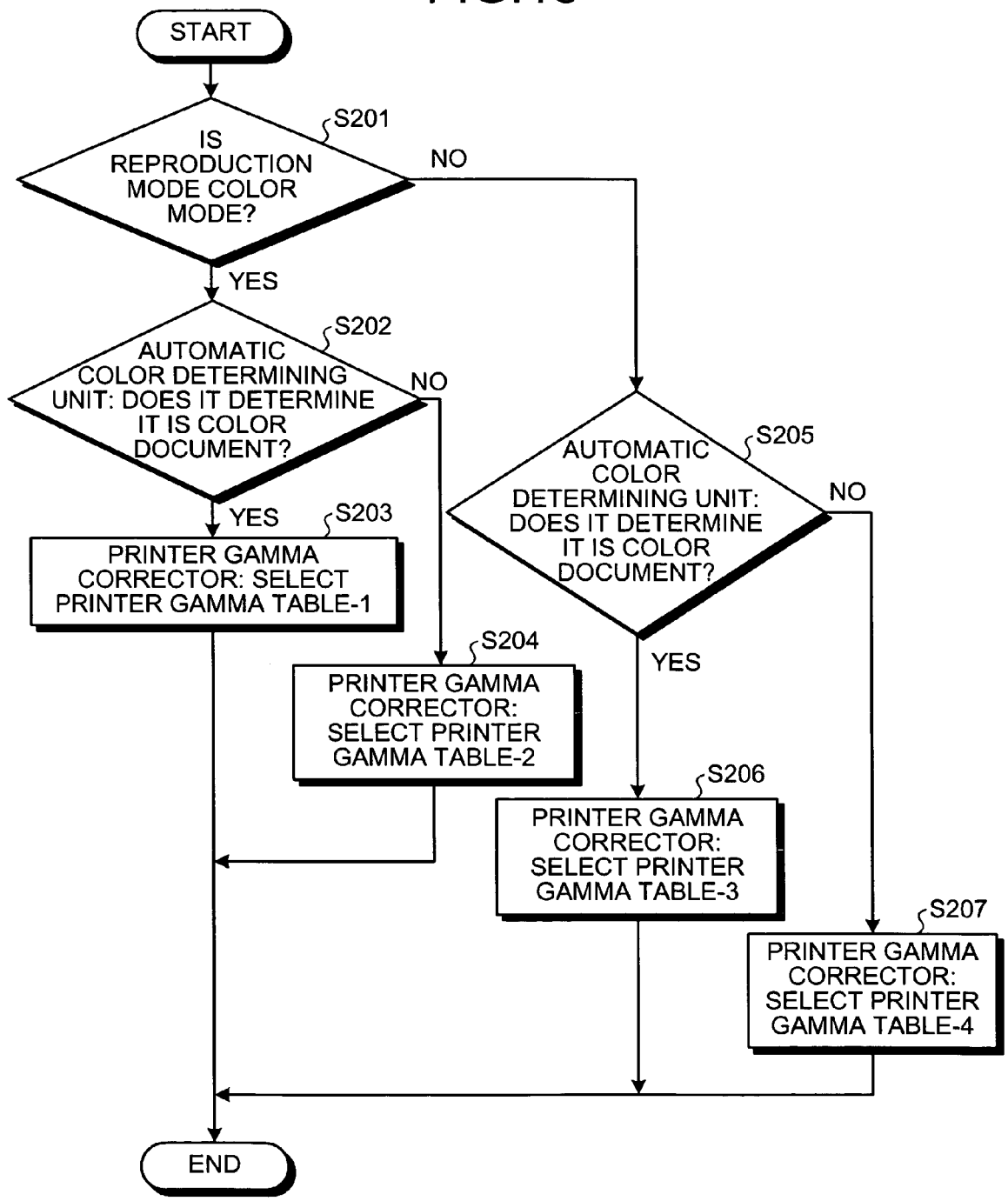
FIG. 18 is a flowchart of a process procedure of the printer gamma corrector.

FIG. 18 is a flowchart of a process procedure of the printer gamma corrector 10. The image processing procedure is made different according to whether the setting of the processing mode is the reproduction mode or the monochrome processing mode, and whether the determination by the automatic color determining unit 14 indicates a color image or a monochrome image.

The printer gamma corrector 10 determines whether the reproduction mode is the color mode (step S201), and when the reproduction mode is the color mode (step S201, Yes), further determines whether the document is a color document (step S202). When the document is the color document (step S202, Yes), the printer gamma corrector 10 selects the printer gamma table-1 (step S203). By using the printer gamma table-1, gamma conversion is performed, by giving higher priority to pattern reproduction with excellent highlight reproduction and tone.

When having determined that the reproduction mode is the color mode, whereas the document is a monochrome document (step S202, No), the printer gamma corrector 10 selects the printer gamma table-2 (step S204), to perform gamma conversion in which highlight is skipped, and higher priority is given to gamma than in the case of a color document without largely degrading the tone, taking characters into consideration.

On the other hand, when the printer gamma corrector 10 has determined that the reproduction mode is the monochrome mode (step S201, No), the automatic color determining unit 14 determines whether the document is a color document (step S205). When the automatic color determining unit 14 determines that the document is a color document (step S205, Yes), the printer gamma corrector 10 selects a printer gamma table-3 (step S206), to perform gamma conversion in which higher priority is given to gamma than in the case of the color mode, to improve the character reproducibility, while attaching importance to pattern reproduction with excellent highlight reproduction and tone.

When having determined that the reproduction mode is the monochrome mode (step S201, No) and that the document is a monochrome document (step S205, No), the printer gamma corrector 10 selects a printer gamma table-4 (step S207), to perform gamma conversion in which highlight is skipped and higher priority is given to gamma, while attaching importance to characters.

The printer gamma corrector 10 prepares a gamma table having a characteristic close to the printer gamma table-1 shown in FIG. 16, with excellent highlight reproduction and tone, respectively for the color mode and the color document, with regard to the printer gamma corrector (1) 101, the printer gamma corrector (2) 102, and the printer gamma corrector (3) 103, which are the gamma correctors for CMY signals, and uses the gamma tables at all times.

According to the first embodiment, even at the time of color mode, monochrome documents can be reproduced with the black character image quality, not only for the edges but also for the inside of characters. Furthermore, even at the time of monochrome mode, the color documents can be reproduced with excellent tone, and the monochrome documents are specialized in black characters and excellent images can be reproduced.

An image processor according to a second embodiment of the present invention is different from that of the first embodiment in that the UCR/black generating unit generates a black (K) signal corresponding to a high-density black material and a light black (Lk) signal corresponding to a light-density black material, and an output controller 19 applies the gamma correction processing and the pseudo tone processing to the respective signals. Accordingly, a printer 12' in the second embodiment outputs a reproduced image in five colors, that is, Lk as a light toner of K in addition to the four CMYK colors.

Figure 19:
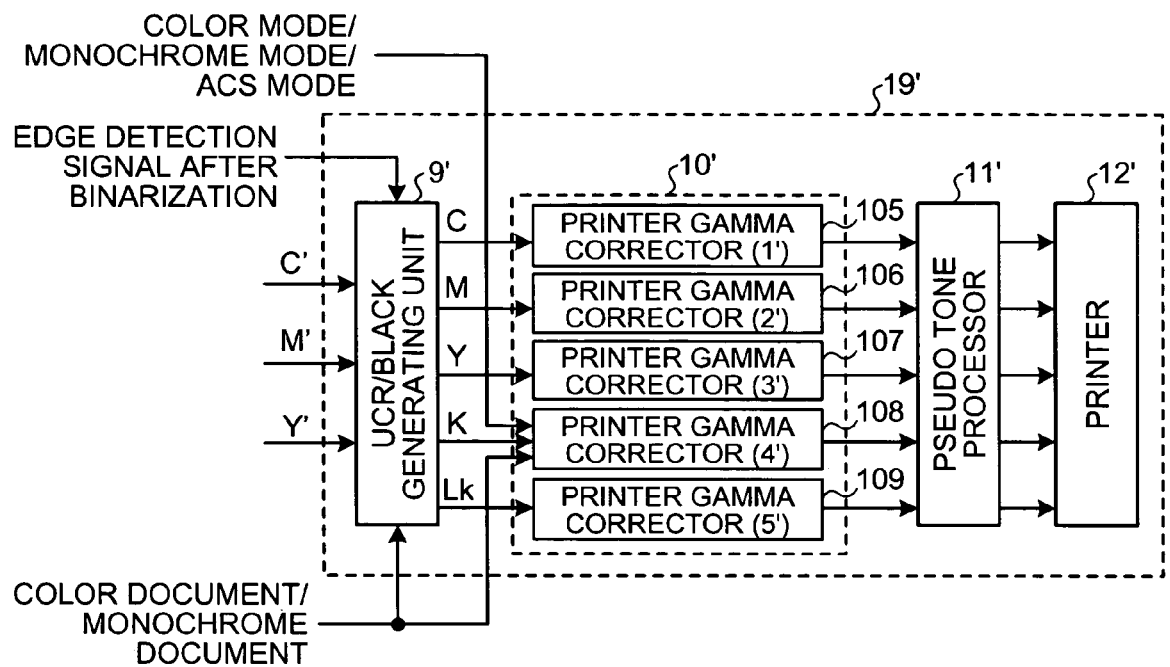
FIG. 19 is a functional block diagram of an output controller in an image processor according to a second embodiment of the present invention.
Figure 20:
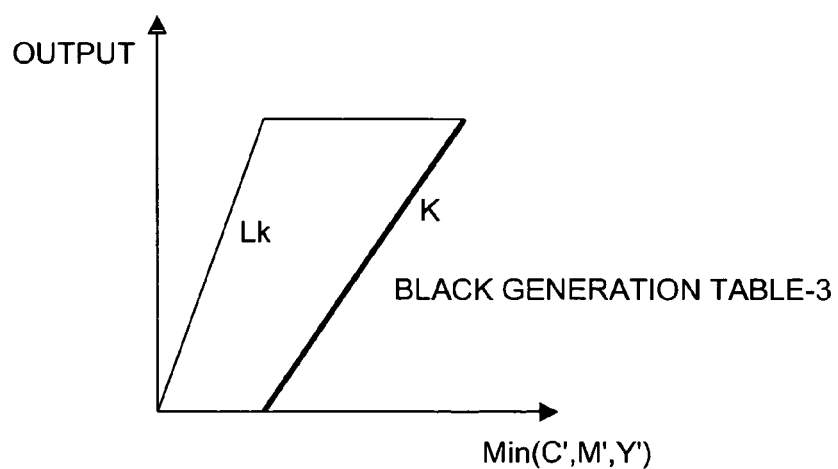
FIG. 20 is a schematic diagram representing K and Lk black generation table used by a UCR/black generating unit.

FIG. 19 is a functional block diagram of an output controller 19' in the image processor according to the second embodiment. FIG. 20 is a schematic diagram of one example of K and Lk black generation tables used by a UCR/black generating unit 9'. FIG. 21 is a table selected by the UCR/black generating unit 9' according to operator's selection and automatic color selection.

The UCR/black generating unit 9' changes over the black generation table according to the table shown in FIG. 19, corresponding to the automatic color determination result by the automatic color determining unit 14 and the edge detection signal after binarization. In the case of a monochrome document, as in the first embodiment, the black generation table-2 in FIG. 15 is selected, to perform 100% black generation. In the case of a color document and an edge portion, 100% black generation is performed as well. In the case of a color document and a non-edge portion, a black generation table-3 in FIG. 20 is used in the second embodiment. The black generation table-3 is a table for replacing the Min(C', M', Y') by K and Lk, where the highlight portion is expressed only by Lk, and an intermediate portion and a shadow portion are expressed by Lk and L in combination.

A printer gamma corrector 10' is the same as the printer gamma corrector 10 in the first embodiment, where the gamma table for K is changed over according to the reproduction mode and the automatic color determination result, and the gamma table for Lk is fixed at all times as in the case of CMY.

This procedure of image processing by the UCR/black generating unit 9' is executed according to the classification in a table shown in FIG. 21, and hence, explanation using a flowchart is omitted.

Thus, the technique for improving the tone and reducing the granular feel by using both a dark toner and a light toner of the same color has been known, for example, as disclosed in Japanese Patent Application Laid-Open No. H11-84764. In the second embodiment, in the case of a color document, reproduction is performed by using K and Lk, aiming at such an effect. On the other hand, in the case of a monochrome document, reproduction is performed only by using K, for suppressing a drop in legibility due to printing deviation at the time of printer output, giving higher priority to the character image quality. Accordingly, black processing most suitable for the color document and the monochrome document, respectively, can be realized in the color mode and in the monochrome mode.

In the second embodiment, an example has been explained, in which K as a dark toner and Lk as a light toner are combined to reproduce an image. However, as a combination of toners other than CMYK, there is a method of adding a transparent toner to reproduce an image. By using the transparent toner, the gloss level can be made uniform, and particularly, a copy image of a silver salt photograph can give an impression with high fidelity to the original image. When this method is applied to the second embodiment, in the case of a color document, image reproduction can be changed over to the one using the transparent toner, and in the case of a monochrome document, to the one that does not use the transparent toner.

FIG. 22 is a functional block diagram of an automatic color determining unit in an image processor according to a third embodiment of the present invention. Like parts as in the first embodiment (FIG. 3) are not explained here, and only a different point is explained.

An automatic color determining unit 14' has a threshold storage memory 147, and changes over the value of a threshold Th_acs used by a continuous counting unit 146' in accordance with a reproduction mode selection signal input by a user from the operation panel 13. Specifically, when the color mode is selected, the value of Th_acs is increased than the value of Th_acs at the time of selecting the ACS mode, and even when there is a small color area in the document, it is determined that the document is a monochrome document.

In the case of a document in which most part is, for example, black character images, if in the ACS mode, even when the color area is very small, the document is determined to be a color document to perform color reproduction, which can be meaningful. However, in the case of the color mode, application of high black processing, which is color reproduction processing for a monochrome document, is more suitable for the image processing of such a document. According to the third embodiment, a document in which most part is monochrome, yet there is a small color area, can be reproduced well even at the time of selecting the color mode.

An image processor according to a fourth embodiment of the present invention is an image processor in a copying machine having an ADF function for sequentially and automatically carrying a plurality of documents to a reader of the scanner. A configuration in which images of a plurality of pages stored in the image memory 3 are specified later and output collectively is also possible. In this case, the reproduction mode is fixed; however, if image processing is changed over in accordance with the automatic color determination result for each page, a difference occurs in the image quality for each page, thereby causing an unnatural feeling.

Therefore, the image processing condition is determined for the first page according to the automatic color determination result, and image processing is performed for the second page onward under the image processing condition for the first page.

Thus, according to the image processor in the fourth embodiment, for example, when copy is made continuously for a plurality of pages, the uniformity of the image quality can be ensured.

Figure 23:
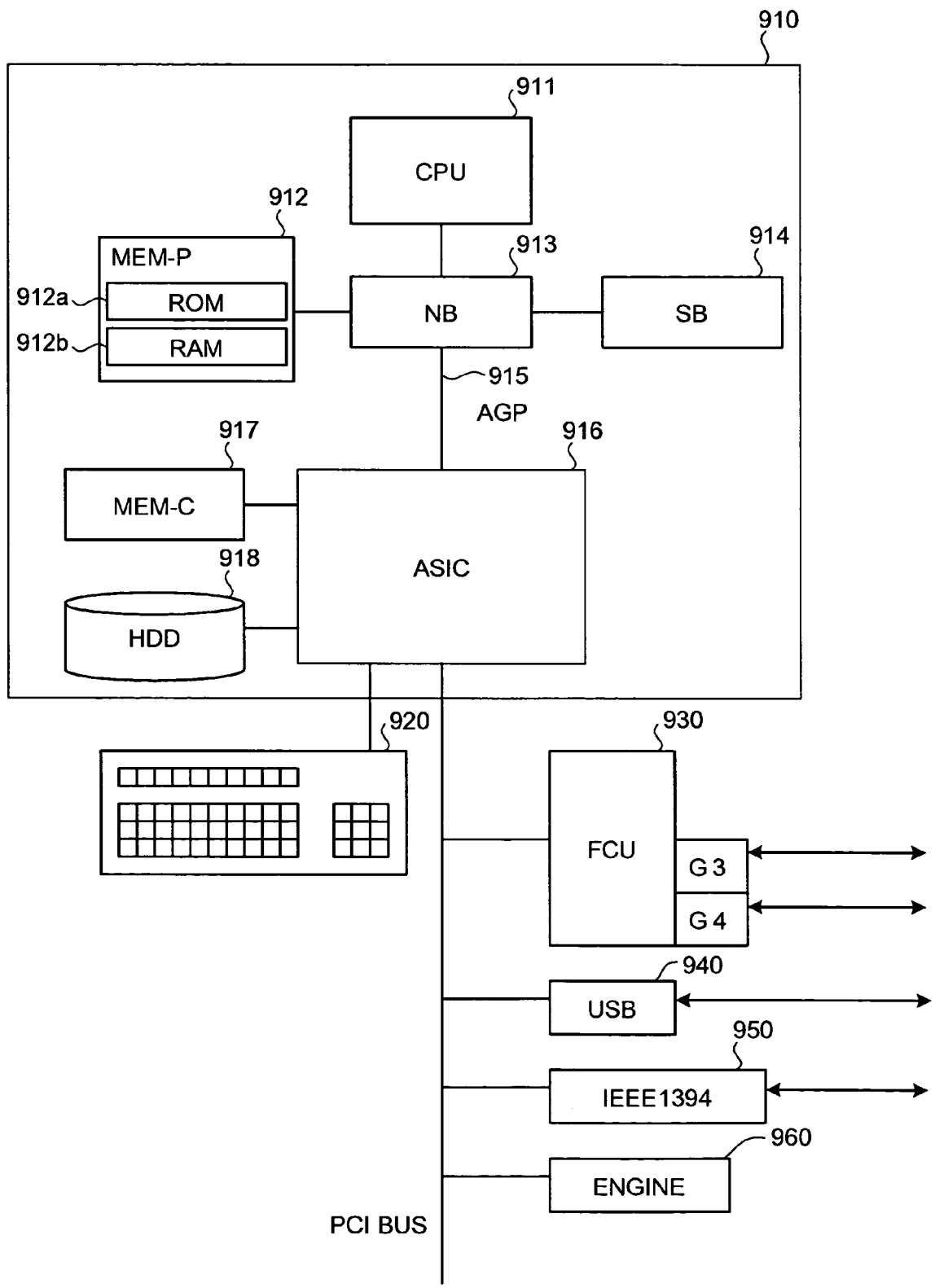
FIG. 23 is a block diagram of a hardware configuration of an image forming apparatus that includes the image processor.

FIG. 23 is a block diagram of a hardware configuration of the image forming apparatus that includes such an image processor. The image forming apparatus has a configuration in which a controller 910 is connected to an engine 960 by a peripheral component interconnect (PCI) bus. The controller 910 controls the whole image forming apparatus, image read, image processing, and input from an operation unit (not shown). The engine 960 is, for example, an image processing engine connectable to the PCI bus, and for example, includes an image processing part such as error diffusion and gamma conversion with respect to the obtained image data.

The controller 910 has a central processing unit (CPU) 911, a north bridge (NB) 913, a system memory (MEM-P) 912, a south bridge (SB) 914, a local memory (MEM-C) 917, an application specific integrated circuit (ASIC) 916, and a hard disk drive 918, where the north bridge 913 and the ASIC 915 are connected with each other via an accelerated graphics port (AGP) bus 915. The MEM-P 912 has a read only memory (ROM) 912a and a random access memory (RAM) 912b.

The CPU 911 controls image processing of the image forming apparatus and the whole image forming apparatus, has a chip set formed of the NB 913, the MEM-P 912, and the SB 914, and is connected to other equipment via the chip set.

The NB 913 is a bridge for connecting the CPU 911 to the MEM-P 912, the SB 914, and the AGP 915, and has a memory controller that controls read/write with respect to the MEM-P 912, a PCI master, and an AGP target.

The MEM-P 912 is a system memory used as a storage memory for programs and data, and an expansion memory for programs and data, and formed of the ROM 912a and the RAM 912b. The ROM 912a is a read only memory used as the storage memory for programs and data, and the RAM 912b is a writable and readable memory used as the expansion memory for programs and data, and an image drawing memory at the time of image processing.

The SB 914 is a bridge for connecting the NB 912 to the PCI device and peripheral devices. The SB 914 is connected to the NB 912 via the PCI bus, and also a network interface (I/F) and the like are connected to the PCI bus.

The ASIC 916 is an integrated circuit (IC) for multi-media information processing application having a hardware component for multi-media information processing, and has a role of a bridge respectively connecting the AGP 915, the PCI bus, the HDD 918, and the MEM-C 917.

The ASIC 916 is connected to a facsimile control unit 930 that controls transmission of data switching two protocols G3 and G4, a universal serial bus (USB) 940, and to the Institute of Electrical and Electronics Engineers (IEEE) 1394 interface 950, between a PCI target, an AGP master, an arbiter (ARB) that is the core of the ASIC 916, a memory controller that controls the MEM-C 917, a plurality of direct memory access controllers (DMAC) that performs rotation and the like of the image data by the hardware logic and the like, and the engine 960.

The MEM-C 917 is a local memory used as an image buffer for transmission and a code buffer. The HDD 918 is a storage unit for storing image data, programs, font data, and forms.

The AGP 915 is a bus interface for a graphics accelerator card proposed for speeding up the graphics processing, and speeds up the graphics accelerator card by directly accessing the MEM-P 912 at a high throughput.

A keyboard 920 connected to the ASIC 916 accepts operation input from an operator, and transmits the operation input information accepted by the ASIC 916.

The image processing program executed by the image processor in the embodiment can be recorded on a computer readable recording medium such as a CD-ROM, a flexible disk (FD), a CD recordable (CD-R), or a digital versatile disk (DVD) in a file of an installable format or an executable format, and provided.

The image processing program executed by the image processor in this embodiment can be stored on a computer connected to a network such as the Internet and downloaded via the network, or can be provided or distributed via the network such as the Internet.

The image processing program executed by the image processor in the embodiment has a module configuration including the respective units described above (the scanner gamma corrector, the scanner color corrector, the filtering processor, the printer color corrector, the UCR/black generating unit, the printer gamma corrector, the pseudo tone processor, and the like). As the actual hardware, the CPU (processor) reads the image processing program from the ROM and executes the program, thereby loading the respective units on the main memory. Accordingly, the scanner gamma corrector, the scanner color corrector, the filtering processor, the printer color corrector, the UCR/black generating unit, the printer gamma corrector, the pseudo tone processor, and the like are created on the main memory.

According to the present invention, even when the monochrome mode by the selection of a user is accepted, image processing is performed with respect to the color image information to be input based on the automatic color determination result. Accordingly, high quality image processing can be applied to the input image.

According to the present invention, even when the monochrome mode by the selection of the user is accepted, image processing is performed with respect to the color image information to be input, by generating a monochrome signal based on the automatic color determination. Accordingly, high quality image processing can be applied to the input image.

According to the present invention, even when the monochrome mode by the selection of the user is accepted, image processing is performed with respect to the color image information to be input, by changing the parameter to generate a monochrome signal based on the automatic color determination. Accordingly, high quality image processing can be applied to the input image.

According to the present invention, even when the monochrome mode by the selection of the user is accepted, two monochrome signals, that is, a black signal corresponding to a high-density black material and a light black signal corresponding to a light-density black material are generated with respect to the color image information to be input, based on the automatic color determination. When the input image is determined to be a monochrome image, only the black signal is generated to apply image processing. Accordingly, high quality image processing can be applied to the input image.

According to the present invention, even when the monochrome mode by the selection of the user is accepted, image processing is performed by applying the filtering process and gamma processing to the color image information to be input based on the automatic color determination. Accordingly, high quality image processing can be applied to the input image.

According to the present invention, even when the monochrome mode by the selection of the user is accepted, image processing is performed by applying the filtering process and gamma processing to the color image information to be input, while changing the parameter of at least one of the filtering process and gamma processing based on the automatic color determination. Accordingly, high quality image processing can be applied to the input image.

According to the present invention, even when the color processing mode by the selection of the user is accepted, image processing is performed with respect to the color image information to be input based on the automatic color determination. Accordingly, high quality image processing can be applied to the input image.

According to the present invention, even when the color processing mode by the selection of the user is accepted, image processing is performed by applying color conversion/image processing for converting the color image information to be input to a color signal corresponding to a color by color image processing including the black material, based on the automatic color determination. Accordingly, high quality image processing can be applied to the input image.

According to the present invention, even when the color processing mode by the selection of the user is accepted, image processing is performed by the applying color conversion/image processing for converting the color image information to be input to a color signal corresponding to a color by color image processing including the black material, while changing the parameter based on the automatic color determination. Accordingly, high quality image processing can be applied to the input image.

According to the present invention, even when the color processing mode by the selection of the user is accepted, two monochrome signals, that is, a black signal corresponding to a high-density black material and a light black signal corresponding to a low-density black material are generated with respect to the color image information to be input, based on the automatic color determination. When the input image is determined to be a monochrome image, only the black signal is generated to apply image processing. Accordingly, high quality image processing can be applied to the input image.

According to the present invention, even when the color processing mode by the selection of the user is accepted, image processing is performed by applying the filtering process and gamma processing to the color image information to be input based on the automatic color determination. Accordingly, high quality image processing can be applied to the input image.

According to the present invention, even when the color processing mode by the selection of the user is accepted, image processing is performed by applying the filtering process and gamma processing to the color image information to be input, while changing the parameter of at least one of the filtering process and gamma processing based on the automatic color determination. Accordingly, high quality image processing can be applied to the input image.

According to the present invention, high-quality image processing can be applied to the input image by performing image processing, by making the image processing condition, at the time of accepting the selection of the automatic processing mode for performing image processing based on the determination result, different from the image processing condition at the time of accepting the color processing mode or the monochrome processing mode. Furthermore, for example, at the time of selecting the color mode, color image reproduction processing for a monochrome document can be applied to a document in which most part of the document is monochrome, yet there is a small color area, thereby enabling reproduction with excellent black character image quality.

According to the present invention, when a plurality of images is continuously output from a recording medium, the image quality can be made uniform by applying the image processing while setting the image processing condition for the second page onward to the same condition as that of the image processing condition for the first page. Accordingly, high-quality image processing can be applied to the input image.

According to the present invention, even when the monochrome mode by the selection of a user is accepted, image processing is performed with respect to the color image information to be input based on the automatic color determination result. Accordingly, high quality image processing can be applied to the input image.

According to the present invention, even when the monochrome mode by the selection of the user is accepted, image processing is performed with respect to the color image information to be input, by generating a monochrome signal based on the automatic color determination. Accordingly, high quality image processing can be applied to the input image.

According to the present invention, even when the monochrome mode by the selection of the user is accepted, image processing is performed with respect to the color image information to be input, by changing the parameter to generate a monochrome signal based on the automatic color determination. Accordingly, high quality image processing can be applied to the input image.

According to the present invention, even when the color processing mode by the selection of the user is accepted, image processing is performed with respect to the color image information to be input based on the automatic color determination. Accordingly, high quality image processing can be applied to the input image.

According to the present invention, even when the color processing mode by the selection of the user is accepted, image processing is performed by applying color conversion/image processing for converting the color image information to be input to a color signal corresponding to a color by color image processing including the black material, based on the automatic color determination. Accordingly, high quality image processing can be applied to the input image.

According to the present invention, even when the color processing mode by the selection of the user is accepted, image processing is performed by applying the color conversion/image processing for converting the color image information to be input to a color signal corresponding to a color by color image processing including the black material, while changing the parameter based on the automatic color determination. Accordingly, high quality image processing can be applied to the input image.

The image processing method according to the present invention can be executed by a computer.

The program according to the present invention can be stored and read by a computer.

Although the invention has been described with respect to a specific embodiment for a complete and clear disclosure, the appended claims are not to be thus limited but are to be construed as embodying all modifications and alternative constructions that may occur to one skilled in the art that fairly fall within the basic teaching herein set forth.

What is claimed is:

1. An image processor, comprising:
    a determining unit that determines whether an input image signal including a plurality of color signals indicates either one of a color image and a monochrome image;
    a processing mode selecting unit that accepts a selection of a color processing mode for applying a color image processing and a monochrome processing mode for applying a monochrome image processing; and
    a processing unit configured to execute an image processing unit that applies an image processing of any one of a color processing and a monochrome processing to the input image signal, the image processing unit including a gamma converter that applies a gamma conversion processing to the input image signal for adjusting a grayscale, wherein,
    when the processing mode selecting unit accepts the selection of the color processing mode and the input image signal has been determined to indicate the monochrome image, the gamma converter applies a gamma conversion processing using a first S-shaped gamma curve that is concave in a highlight portion and an intermediate portion and is convex in a shadow portion, and,
    when the processing mode selecting unit accepts the selection of the monochrome processing mode and the input image signal has been determined to indicate the color image, the gamma converter applies a gamma conversion processing using a second S-shaped gamma curve that is concave in a highlight portion and is convex in an intermediate portion and a shadow portion.

2. The image processor according to claim 1, further comprising:
    an image output unit configured to control an amount of a black toner and an amount of under color removal, based on whether an edge is detected in the input image signal, when the processing mode selecting unit accepts the selection of the color processing mode and the input image signal has been determined to indicate the color image.

3. The image processor according to claim 2, wherein the image output unit is further configured to output a signal indicating zero cyan, magenta, and yellow toner, when (a) the processing mode selecting unit accepts the selection of the color processing mode, (b) the input image signal has been determined to indicate the color image, and (c) the edge is detected in the input image signal.

4. The image processor according to claim 2, wherein the image output unit is further configured to control the amount of under color removal to be zero, when (a) the processing mode selecting unit accepts the selection of the color processing mode, (b) the input image signal has been determined to indicate the color image, and (c) the edge is not detected in the input image signal.

5. The image processor according to claim 2, wherein the image output unit is further configured to output a signal indicating zero cyan, magenta, and yellow toner, when the processing mode selecting unit accepts the selection of the color processing mode and the input image signal has been determined to indicate the monochrome image.

6. The image processor according to claim 1, further comprising:
    an image output unit configured to control an amount of a black toner and an amount of under color removal, based on whether an edge is detected in the input image signal, when the processing mode selecting unit accepts the selection of the color processing mode and the input image signal has been determined to indicate the color image,
    the image output unit further configured to output a signal indicating zero cyan, magenta, and yellow toner, when (a) the processing mode selecting unit accepts the selection of the color processing mode, (b) the input image signal has been determined to indicate the color image, and (c) the edge is detected in the input image signal,
    image output unit further configured to control the amount of under color removal to be zero, when (a) the processing mode selecting unit accepts the selection of the color processing mode, (b) the input image signal has been determined to indicate the color image, and (c) the edge is not detected in the input image signal, and
    the image output unit further configured to output the signal indicating zero cyan, magenta, and yellow toner, when the processing mode selecting unit accepts the selection of the color processing mode and the input image signal has been determined to indicate the monochrome image.

7. The image processor according to claim 1, wherein the image processing unit comprises a monochrome signal generator that generates a monochrome signal for the monochrome image processing from the input image signal when the input image signal has been determined to indicate the color image in the monochrome processing mode.

8. The image processor according to claim 7, wherein the monochrome signal generator generates the monochrome signal by changing a parameter based on a determination result by the determining unit.

9. The image processor according to claim 8, wherein, when the image processing unit transmits an image processed signal to an image output unit, and the image output unit outputs the image processed signal with a high-density black material and a low-density black material, the monochrome signal generator generates a black signal for outputting the image processed signal with the high-density black material and a light black signal for outputting the image processed signal with the low-density black material, and, when the determination result by the determining unit indicates the monochrome image, the monochrome signal generator generates only the black signal.

10. The image processor according to claim 1, wherein the image processing unit comprises:
a filtering processor that applies a filtering process of at least one of a smoothing process and an edge enhancement process with respect to the input image signal, based on a determination result by the determining unit.

11. The image processor according to claim 10, wherein at least one processing of the filtering process and the gamma conversion processing is applied to the input image signal with a parameter based on the determination result by the determining unit.

12. The image processor according to claim 1, wherein the processing mode selecting unit accepts a selection of an automatic processing mode for applying an image processing based on a determination result by the determining unit, in addition to the color processing mode and the monochrome processing mode, and
the image processing unit applies the image processing of the automatic processing mode to the input image signal, by making an image processing condition of the automatic processing mode accepted by the processing mode selecting unit different from an image processing condition of the color processing mode and the monochrome processing mode accepted by the processing mode selecting unit.

13. The image processor according to claim 1, wherein, when a plurality of images is continuously output from a recording medium to an image output unit, the image processing unit applies the image processing while setting an image processing condition for a second page onward to a same condition as that of an image processing condition for a first page.

14. The image processor according to claim 1, wherein the image processing unit comprises a color converter that converts the input image signal, when the input image signal has been determined to indicate the monochrome image in the color processing mode, to a color signal corresponding to a color by a color image processing including a black material based on a determination result by the determining unit, and the image processing unit applies an image processing to the color signal.

15. The image processor according to claim 14, wherein the color converter changes a parameter based on the determination result by the determining unit to convert the input image signal to the color signal.

16. An image processing method for an image processor, the image processing method comprising:
determining whether an input image signal including a plurality of color signals indicates either one of a color image and a monochrome image;
selecting either one of a color processing mode for applying a color image processing and a monochrome processing mode for applying a monochrome image processing; and
applying an image processing of either one of a color processing and a monochrome processing to the input image signal with the image processor, the applying including applying a gamma conversion processing to the input image signal for adjusting a grayscale, wherein,
when the selection of the color processing mode is selected in the selecting and the input image signal has been determined to indicate the monochrome image, a gamma conversion processing using a first S-shaped gamma curve that is concave in a highlight portion and an intermediate portion and is convex in a shadow portion is applied, and,
when the monochrome processing mode is selected in the selecting and the input image signal has been determined to indicate the color image, the gamma converter applies a gamma conversion processing using a second S-shaped gamma curve that is concave in a highlight portion and is convex in an intermediate portion and a shadow portion is applied.

17. The image processing method according to claim 16, wherein the applying the image processing comprises generating a monochrome signal for the monochrome image processing from the input image signal, when the input image signal has been determined to indicate the color image in the monochrome processing mode.

18. The image processing method according to claim 17, wherein the generating is conducted by changing a parameter based on a result of the determining.

* * * * *